Jan. 2, 1951  P. GODENNE  2,536,499
DEVICE FOR TAKING RADIOGRAMS
Filed Feb. 27, 1948  3 Sheets-Sheet 1

INVENTOR.
PIERRE GODENNE
BY
ATTORNEY

Jan. 2, 1951 P. GODENNE 2,536,499
DEVICE FOR TAKING RADIOGRAMS
Filed Feb. 27, 1948 3 Sheets-Sheet 2
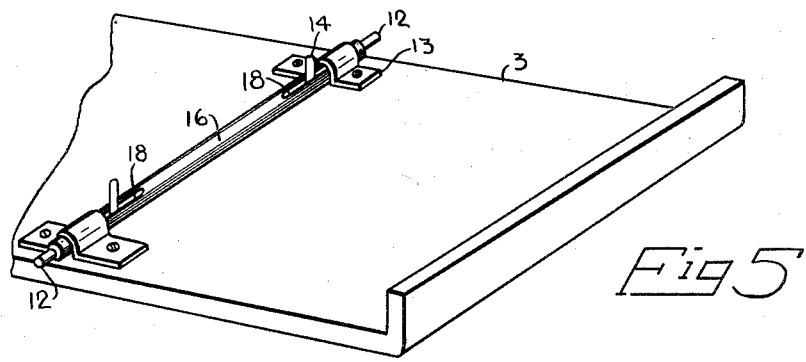
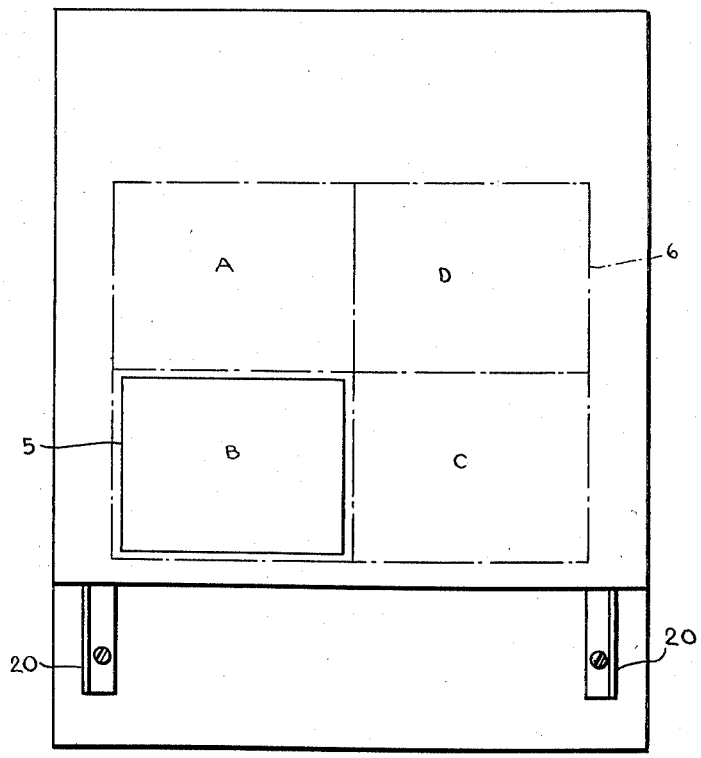
INVENTOR.
PIERRE GODENNE
BY
ATTORNEY Jan. 2, 1951 P. GODENNE 2,536,499
DEVICE FOR TAKING RADIOGRAMS
Filed Feb. 27, 1948 3 Sheets-Sheet 3
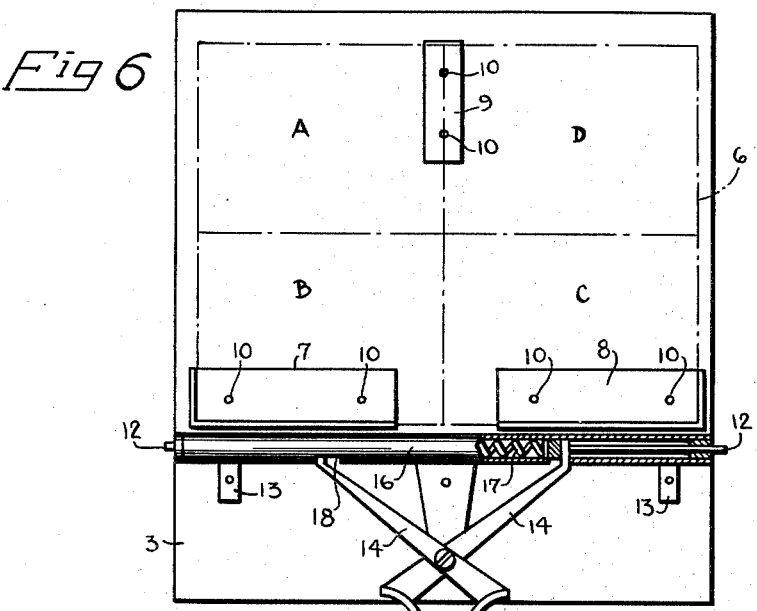
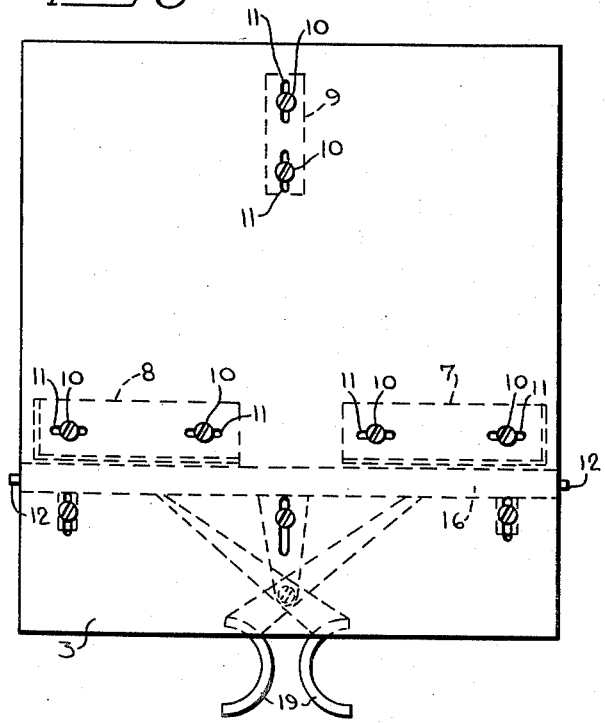
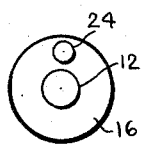
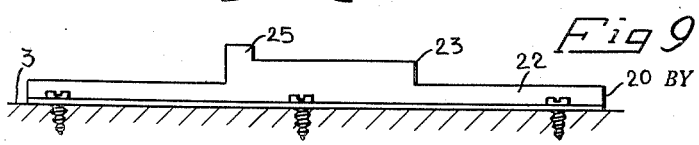
INVENTOR.
PIERRE GODENNE
ATTORNEY Patented Jan. 2, 1951

2,536,499

UNITED STATES PATENT OFFICE 2,536,499

DEVICE FOR TAKING RADIOGRAMS

Pierre Godenne, Brussels, Belgium

Application February 27, 1948, Serial No. 11,433
In Belgium November 3, 1944

Section 1, Public Law 690, August 8, 1946
Patent expires November 3, 1964

6 Claims. (Cl. 250—68)

The present invention relates to a device for taking radiograms.

All the film-carrier frames corresponding to a same size of films are not of the same external dimensions. It is an object of the present invention to permit the radiographer to use his various frames in a same case without being obliged to purchase a standard frame and suitable intensifying screens. To this end, said slide carries adjustable setting means for said film-carrier.

In an advantageous embodiment, said setting means consist of at least two angles secured to the slide by at least one clamping means.

Another object of the invention is to permit of taking several radiograms on a single film or plate. Such radiograms are frequent for face and side-face takings and for the stereoscopic radiograms. The appliance used comprises a parallelepipedic case one of the small faces of which is open for the introduction of a film-carrier slide and of which the face opposite that serving as support for the slide, carries a plate made of material opaque to X-rays and provided with a gate.

According to the invention, there is provided a means for locking the slide relatively to the case in order to fix the slide in several positions relatively to the gate.

In an advantageous embodiment, said locking means is at least one lock arranged on the slide edge adjacent to that face of the case which serves as guide therefor, so as to abut in closed position the edge thereof.

Other details and features of the invention will appear from the description of a device adapted for taking multiple radiograms, taken hereinafter by way of non-limitative example in conjunction with the accompanying drawings.

Fig. 1 is a perspective view of a case adapted for taking four negatives, according to the invention, with the slide removed.

Fig. 2 relates to the same device but for two negatives.

Fig. 5 is a perspective view partly broken away of an alternative form of the locking device shown in Fig. 4.

Fig. 6 is a plan view of a slide provided with modified locking device.

Fig. 7 is a plan view of the case provided with guiding tracks for the slide.

Fig. 8 is a bottom view of the slide shown in Fig. 6.

Fig. 9 is an elevation of one track of the case shown in Fig. 7.

Fig. 10 is a fragmentary end view of the locking device as in Fig. 6, showing a detail.

In the various figures, like reference numerals denote identical parts.

The device according to the invention consists of a parallelepiped-shaped case 1 provided with an opening 2 permitting of the introduction of a slide 3; said opening is carried out by removing one of the small faces of the parallelepiped.

Figure 1:
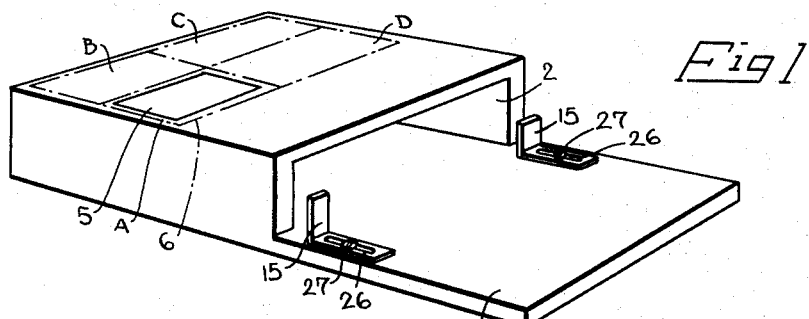
Figure 2:
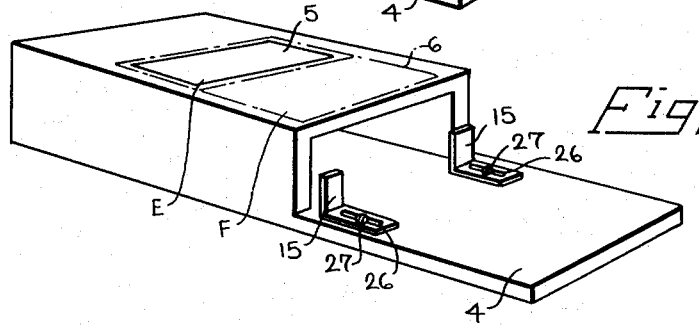
Figure 3:
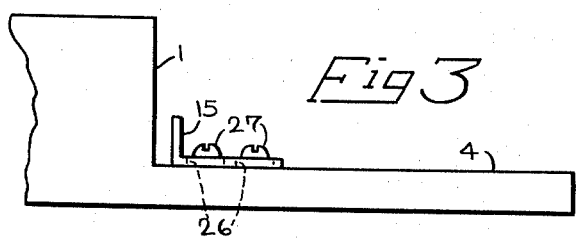
Fig. 3 is a side view partly broken away of the case shown in Fig. 1.

The case is extended preferably with a platform 4 serving to hold the slide during the several takings of radiography. A plate made of material impervious to X-rays, such as lead, is disposed within the thickness of the upper face of the case and is so dimensioned as to cover the whole surface of the film except for a small place defined by a gate 5 provided therein (Figs. 1 and 2). The distance between said gate and the film-carrier or plate 6, shown in dotted lines, placed on the slide must be the smallest as possible so as to permit the most distinct images to be taken.

The slide 3 consists of a plate slidable in the opening 2 of the case. Said slide will be preferably guided along the edges of this opening to avoid irregularities in the working thereof.

Figure 4:
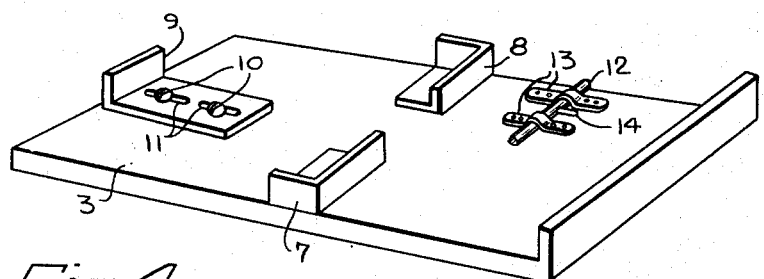
Fig. 4 is a perspective view of a slide provided with a locking device.

The slide plate carries as shown in Fig. 4 three angles 7, 8 and 9, which are secured to the plate by means of screws 10 engaged in grooves 11 which may be provided either in the angles (Fig. 4) or in the very plate of the slide (Fig. 8).

Thus, any film- or plate-carrier having approximately the same size as the device used, may be equally well held on the slide by adjusting said angles once for all. When the film-carrier is fixed in position on the slide, this latter is introduced in the case so as to present successively before the gate 5 its zones E, F in case of one stereoscopic couple and the zones A, B, C, D in case of two stereoscopic couples on the same film or plate.

In order to proceed with accuracy, there will be provided means for locking the slide relatively to the case so that said means being in due position, a well determined portion of the film (one of the zones A to D or E, F for instance) is exposed before the gate 5. Now, if this locking means is released and the slide completely pushed inside the case, another film portion or zone exactly equal to the first one and a little apart therefrom, will be in turn exposed before the gate 5.

When the object to be radiographed is placed before the gate 5 and two radiograms are successively taken by moving between the two takings, the radiographic tube along a determined distance preferably equal to six cm. in the sliding axis of the slide, and by displacing the slide from the position A to the position B or from C to D or from E to F, two stereoscopic negatives of the object aimed will be obtained if the gate 5 covers approximately the half size of the case while four negatives are produced in case of the gate 5 covering approximately the quarter of said surface.

The two corresponding negatives $A+B$ or $C+D$ or $E+F$, being fixed on a same film with their upper and lower edges situated along a same line strictly parallel to the edge of the film, may be examined without further handling or additional mounting, in the conventional apparatus or in the stereoscopic binoculars.

The control of the locking device acting on the slide relatively to the case may be effected in various manners.

According to a first embodiment, there is provided a lock of which a rod 12 acting as lug, slides in a sheath formed with two yokes 13 and is moved through these yokes by means of a lever 14 (Fig. 4).

The disposition of said lock on the slide will be so calculated that with the film-carrier being fixed and the lock in closed position, if the slide is now introduced inside the case, the portion A of the film-carrier, in case of a slide for two couples of radiograms, or the portion E, in case of a slide for one couple of radiograms, will then appear before the gate 5. When the lock is in open position by completely pushing said slide inside the case, the portion B of the film-carrier or contingently the portion F will appear before the gate. Once the portions A and B or E and F are sensitized, the slide is removed and the film- or plate-carrier frame is inverted so as to bring the portion C in the position previously occupied by the portion A and the device is ready for a new operation. By this way, two stereoscopic couples are obtained on a single film or plate.

In order to avoid the deterioration of the case caused by the abutting of the lock, one or two angles 15 may be arranged before the opening 2, which will serve as buffers and wherein grooves 26 are provided. Set-screws 27 engaged in these grooves permit of adjusting once and for all the extent to which said slide is to be engaged for the purpose of exactly locating the same in its operative position.

The lock 12 itself may be accommodated in a cylindrical sheath 16 under the action of springs 17 housed in the sheath. Said springs will be controlled by levers 14 sliding in a suitable groove 18 (Fig. 5).

Said levers may be provided in crosswise arrangement (Fig. 6) and present controlling handles or loops 19. These levers will then be operated as scissors and the handles 19 will serve to facilitate the retraction of the slide. Tracks consisting of angles 20 (Fig. 7) will be conveniently provided for the sliding of said slide 3.

Said angles 20 have one arm 22 secured by screws 21 to the case 1 while the other will be provided with stops corresponding to the radiograms A and B. The stop 23 will correspond to the lug 12 of the lock in closed position, thus to the radiogram A or C or E. When the levers 14 are operated and the lock 12 is retracted in the sheath, it becomes possible to move the slide together with the sheath 16 which carries a second stationary lug 24 abutting the stop 25 which corresponds to the position of the slide for the radiogram B or D or F.

It should be understood that the invention is in no way limited to the embodiments hereinbefore described and that many modifications may be made therein, in particular as regards the shape, construction, number and arrangement of the elements involved in carrying it out, without exceeding the scope of the present patent application, provided that these changes are compatible with the spirit of the appended claims.

I claim:

1. A device for taking X-ray pictures comprising a parallelepipedic housing having a top, side walls, a rear wall and a flat bottom, said housing being open at the front side and said bottom projecting at said open side beyond the length of said housing to form a platform, a film carrier supporting slide adapted to be moved from said platform into said housing, said slide having a width substantially equal to the inner width of said housing, the side walls thereof forming a guide for the displacement of the slide into and from said housing, a plate of a material impervious to X-rays located in said top, an exposure gate in said plate, a releasable slide locking member on said slide adapted to be pushed into locking contact with the outer edge of said side walls to secure the slide in a plurality of operating positions relative to said exposure gate.

2. A device for taking X-ray pictures comprising a parallelepipedic housing having a top, side walls, a rear wall and a flat bottom, said housing being open at the front side and said bottom projecting at said open side beyond the length of said housing to form a platform, a film carrier supporting slide adapted to be moved from said platform into said housing, said slide having a width substantially equal to the inner width of said housing the side walls thereof forming a guide for the displacement of said slide into and from said housing, a plate of a material impervious to X-rays located in said top, an exposure gate in said plate, a slide positioning rod displaceably located on said slide near to a lateral edge thereof adapted to be pushed into locking contact with the outer edge of said side walls to secure the slide in a plurality of operating positions relative to said exposure gate.

3. A device for taking X-ray pictures comprising a parallelepipedic housing having a top, side walls, a rear wall and a flat bottom, said housing being open at the front side and said bottom projecting at said open side beyond the length of said housing to form a platform, a film carrier supporting slide adapted to be moved from said platform into said housing, said slide having a width substantially equal to the inner width of said housing, the side walls thereof forming a guide for the displacement of said slide into and from said housing, a plate of a material impervious to X-rays located in said top, an exposure gate in said plate, a plurality of adjustable angles on said platform for the positioning thereon of said film carrier, a releasable slide positioning rod located near to a lateral edge of said slide adapted to be pushed into abutting contact with the outer edge of said slide walls to secure the slide in a plurality of opening positions relative to said exposure gate.

4. A device for taking X-ray pictures comprising a parallelepipedic housing having a top, side walls, a rear wall and a flat bottom, said housing being open at the front side and said bottom projecting at said open side beyond the length of said housing to form a platform, a film carrier supporting slide adapted to be moved from said platform into said housing, said slide having a width substantially equal to the inner width of said housing, the side walls thereof forming a guide for the displacement of said slide into and from said housing, a plate of a material impervious to X-rays located in said top, an exposure gate in said plate, two releasable slide positioning rods displaceably located at the lateral edges of said slide, levers connected to the inner ends of said rods to push the same in a locking position with the outer edges of said side walls and to secure the slide in a plurality of operating positions relative to said exposure gate.

5. A device for taking X-ray pictures comprising a parallelipipedic housing having a top, side walls, a rear wall and a flat bottom, said housing being open at the front side and said bottom projecting at said open side beyond the length of said housing to form a platform, a film carrier supporting slide adapted to be moved from said platform into said housing, said slide having a width substantially equal to the inner width of said housing the side walls thereof forming a guide for the displacement of the slide into and from said housing, a plate of a material impervious to X-rays located in said top, an exposure gate in said plate, two releasable slide positioning rods located near to the lateral edges of said slide and adapted to be moved in a locking position with the outer edges of said side walls to secure the slide in a plurality of operating positions relative to said exposure gate, a tubular sheath housing said slide positioning rods, a spring housed inside of said sheath between said rods to press the same into their inoperative position and means to urge said positioning rods into their operative position against the action of said spring.

6. A device for taking X-ray pictures comprising a parallelepipedic housing having a top, side walls, a rear wall and a flat bottom, said housing being open at the front side and said bottom projecting at said open side beyond the length of said housing to form a platform, a film carrier supporting slide adapted to be moved from said platform into said housing, said slide having a width substantially equal to the inner width of said housing, the side walls thereof forming a guide for the displacement of the slide into and from said housing, a plate of a material impervious to X-rays located in said top, an exposure gate in said plate, two releasable slide positioning rods located near to the lateral edges of said slide and adapted to be moved in a locking position with the outer edges of said side walls to secure the slide in a plurality of operating positions relative to said exposure gate, a tubular sheath housing said slide positioning rods, a spring housed inside of said sheath between said rods to press the same into their inoperative position and a scissors-like handle connected to the inner ends of said rods to urge the same into their operative position against the action of said spring.

PIERRE GODENNE.

REFERENCES CITED

The following references are of record in the file of this patent:

UNITED STATES PATENTS

| Number | Name | Date |
|---|---|---|
| 1,933,652 | Boldingh | Nov. 7, 1933 |
| 2,056,279 | Kulick | Oct. 6, 1936 |
| 2,063,878 | Linke et al. | Dec. 8, 1936 |
| 2,331,225 | Powers | Feb. 29, 1924 |

FOREIGN PATENTS

| Number | Country | Date |
|---|---|---|
| 567,361 | France | Feb. 29, 1924 |